US006788272B2

(12) United States Patent
McCarthy et al.

(10) Patent No.: US 6,788,272 B2
(45) Date of Patent: Sep. 7, 2004

(54) FEED NETWORK

(75) Inventors: Robert Daniel McCarthy, Newbury Park, CA (US); Russell Alan Fix, Camarillo, CA (US)

(73) Assignee: Andrew Corp., Orland Park, IL (US)

( * ) Notice: Subject to any disclaimer, the term of this patent is extended or adjusted under 35 U.S.C. 154(b) by 68 days.

(21) Appl. No.: 10/252,634

(22) Filed: Sep. 23, 2002

(65) Prior Publication Data

US 2004/0056819 A1 Mar. 25, 2004

(51) Int. Cl.[7] .................................................. H04Q 1/36
(52) U.S. Cl. ........................ 343/895; 343/850; 343/853
(58) Field of Search .......................... 343/895, 700 MS, 343/850, 853, 858

(56) References Cited

U.S. PATENT DOCUMENTS

| | | | | |
|---|---|---|---|---|
| 5,134,422 A | * | 7/1992 | Auriol | 343/895 |
| 5,198,831 A | * | 3/1993 | Burrell et al. | 343/895 |
| 5,349,365 A | | 9/1994 | Ow et al. | |
| 5,541,617 A | | 7/1996 | Connolly et al. | |
| 5,581,268 A | * | 12/1996 | Hirshfield | 343/853 |
| 5,786,793 A | | 7/1998 | Maeda et al. | |
| 5,872,549 A | * | 2/1999 | Huynh et al. | 343/895 |
| 5,955,997 A | | 9/1999 | Ho et al. | |
| 5,986,616 A | * | 11/1999 | Edvardsson | 343/853 |
| 6,011,524 A | | 1/2000 | Jervis | |
| 6,172,656 B1 | | 1/2001 | Ohwada et al. | |
| 6,320,480 B1 | | 11/2001 | Kintis et al. | |

* cited by examiner

*Primary Examiner*—Tho G. Phan
(74) *Attorney, Agent, or Firm*—Welsh & Katz, Ltd.

(57) ABSTRACT

An antenna feed network including a 180° hybrid coupler having a feed port, a 0° port; and a 180° port having an approximately 180° phase difference with the 0° port. A first antenna port is coupled to the 0° port; and a second antenna port is coupled to the 0° port via a respective phased line, the second antenna port having an approximately 90° phase difference with the first antenna port. A third antenna port is coupled to the 180° port; and a fourth antenna port is coupled to the 180° port via a respective phased line, the fourth antenna port having an approximately 90° phase difference with the third antenna port. The feed network can be used to drive antenna elements in phase quadrature. In a preferred embodiment the feed network drives a quadriflar helix antenna.

17 Claims, 5 Drawing Sheets

FEED NETWORK

FIELD OF THE INVENTION

The present invention relates to an antenna feed network, and to an antenna such as a quadrifilar helix antenna incorporating such a feed network.

DESCRIPTION OF THE RELATED ART

A conventional feed network is shown in U.S. Pat. No. 5,541,617. A hybrid junction power divider feed circuit provides 0 to 180° phase shift. The radiating elements are connected to the feed circuit in pairs. The second element of each pair is shorter than the first element by a predetermined distance to provide a phase quadrature between them.

An alternative feed network is shown in FIG. 5 of U.S. Pat. No. 5,955,997. The feed network is a non-isolating inline power splitter with an excess quarter-wavelength line in one output arm to generate the required 90° phase differentials.

A helical antenna is described in U.S. Pat. No. 6,172,656. In the embodiment of FIG. 3, the antenna arms are aperture fed by a drive circuit including a 180° hybrid coupler and two 90° hybrid couplers.

BRIEF DESCRIPTION OF EXEMPLARY EMBODIMENT

An exemplary embodiment of the invention provides an antenna feed network including:

- a 180° hybrid coupler having a feed port, a 0° port, and a 180° port having an approximately 180° phase difference with the 0° port;
- a first antenna port coupled to the 0° port;
- a second antenna port coupled to the 0° port via a respective phased line, the second antenna port having an approximately 90° phase difference with the first antenna port;
- a third antenna port coupled to the 180° port; and
- a fourth antenna port coupled to the 180° port via a respective phased line, the fourth antenna port having an approximately 90° phase difference with the third antenna port.

It will be appreciated by a skilled person that the actual phase difference between the ports may differ slightly from the approximate values given above: in practice the phase difference may vary by up to 2%, or even in extreme cases up to 5% either side of the approximate value.

The feed network may be incorporated into an antenna in which a radiating element is coupled to each antenna port. A preferred application for the antenna is for receiving satellite Global Positioning System (GPS) signals.

BRIEF DESCRIPTION OF THE DRAWINGS

Illustrative embodiments of the invention will now be described with reference to the accompanying drawings to disclose the advantageous teachings of the present invention.

DETAILED DESCRIPTION OF EMBODIMENTS OF THE INVENTION

Figure 1:
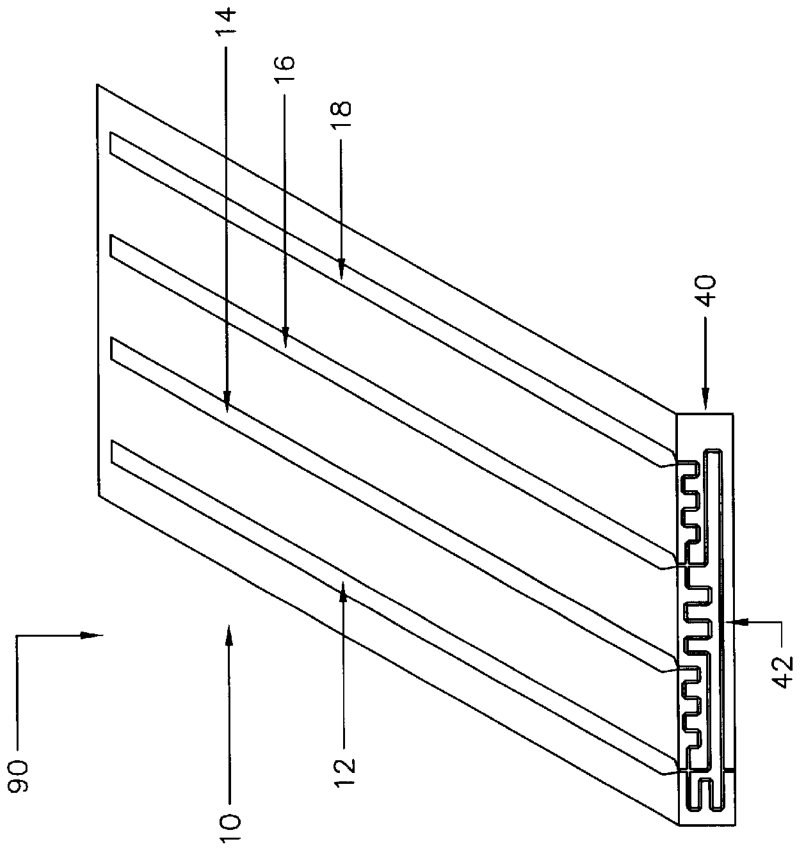
FIG. 1 is a planar view of an open circuit quadrifilar antenna constructed in accordance with the teachings of the present invention.

FIG. 1 is a planar view of a quadrifilar helix antenna 90 constructed in accordance with the teachings of the present invention. The antenna 1 is made of a radiating segment 10 and a base segment 40. The radiating segment 10 includes radiating elements 12, 14, 16 and 18. The base segment 40 contains a microstrip hybrid junction power divider feed circuit 42 on one side and a ground plane 60 (not shown) on the opposite side. Both segments 40,10 of the antenna 90 are made of one single section of dielectric substrate on which copper (or any suitable conductor) is deposited or etched to form the radiating elements 12, 14, 16 and 18, the hybrid junction power divider feed circuit 42, and the ground plane 60.

As is illustrated in FIG. 1, the radiating elements 12, 14, 16 and 18 are connected to the hybrid junction power divider feed circuit 42 at one end and are open circuited at the other end. The length of each of the four radiating elements is initially ¼ wavelength. However, after tuning and compensation for end effects, the resulting length is shorter than ¼ wavelength. Nevertheless, the elements operate in ¼ wavelength mode.

Figure 2:
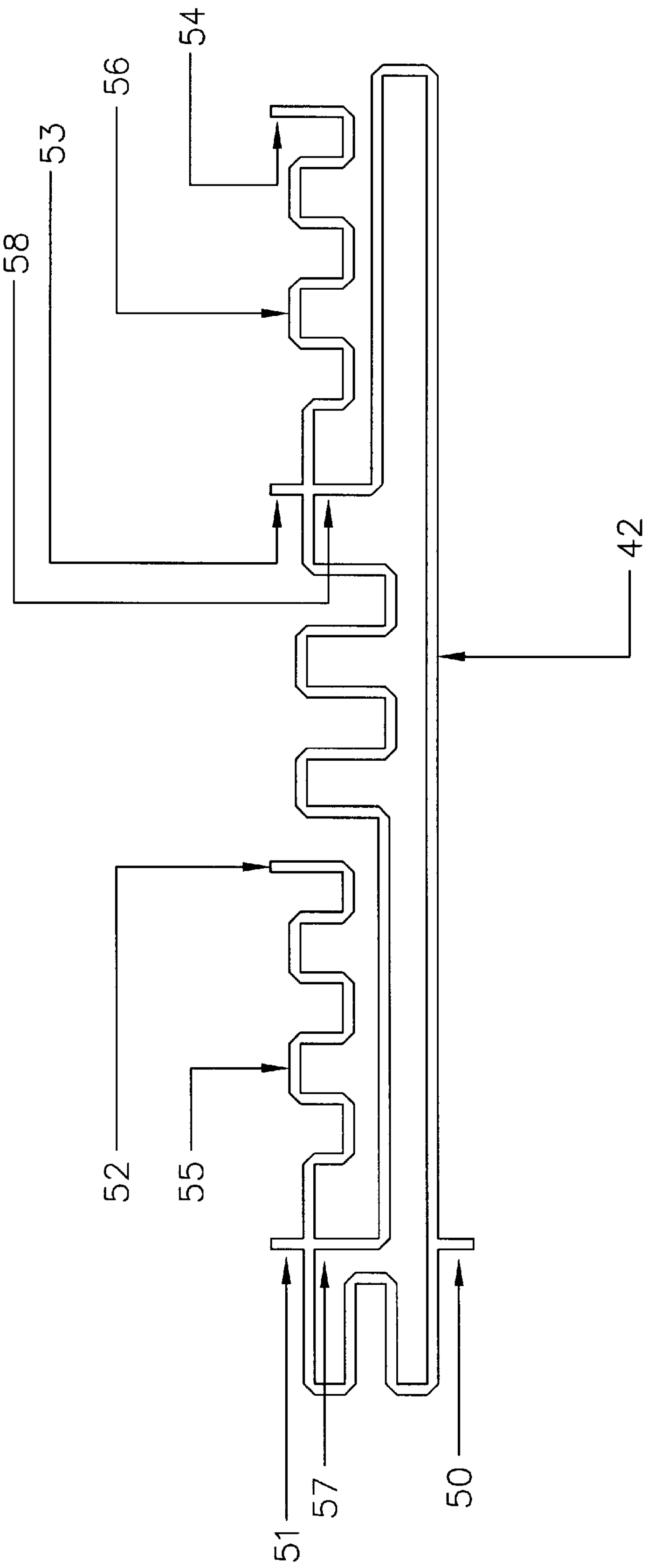
FIG. 2 is an enlarged view of the feed network.

FIG. 2 shows the feed circuit 42 in more detail. The hybrid coupler has a feed port 50, 0° hybrid port 57 and −180° hybrid port 58. A 0° antenna port 51 is coupled directly to the 0° hybrid port 57. A −90° antenna port 52 is coupled to the 0° hybrid port via a 90° phased line 55. Similarly, a −180° antenna port 54 is coupled directly to the 180° hybrid port 58, and a −270° antenna port 53 is coupled to the 0° hybrid port via a 90° phased line 56. The radiating elements 12, 14, 16 and 18 are contiguous with the antenna ports 54,53,52,51 respectively. Thus the radiating elements are driven in phase quadrature, providing the phase relationships required by circularly polarized beam patterns.

The helical pattern is accomplished by designing the upper segment 10 as a parallelogram having vertical sides set at a predetermined angle (e.g., 50 degrees) above the horizontal line of the rectangularly shaped lower segment 40. The radiating elements are then disposed at the same angle. Thus, once the antenna is turned into a cylinder such that the angled sides of the parallelogram as well as the two vertical sides of the lower segment 40 touch each other to form a seam, the radiating elements produce a helical pattern relative to each other. Note that the helical pattern is controlled by the pitch of the chosen angle. Hence, the more acute the angle, the more turns there will be in the helices formed by the radiating elements 12, 14, 16 and 18 upon the cylindrical transformation of the planar antenna of FIG. 1. (see FIG. 3.)

Figure 3:
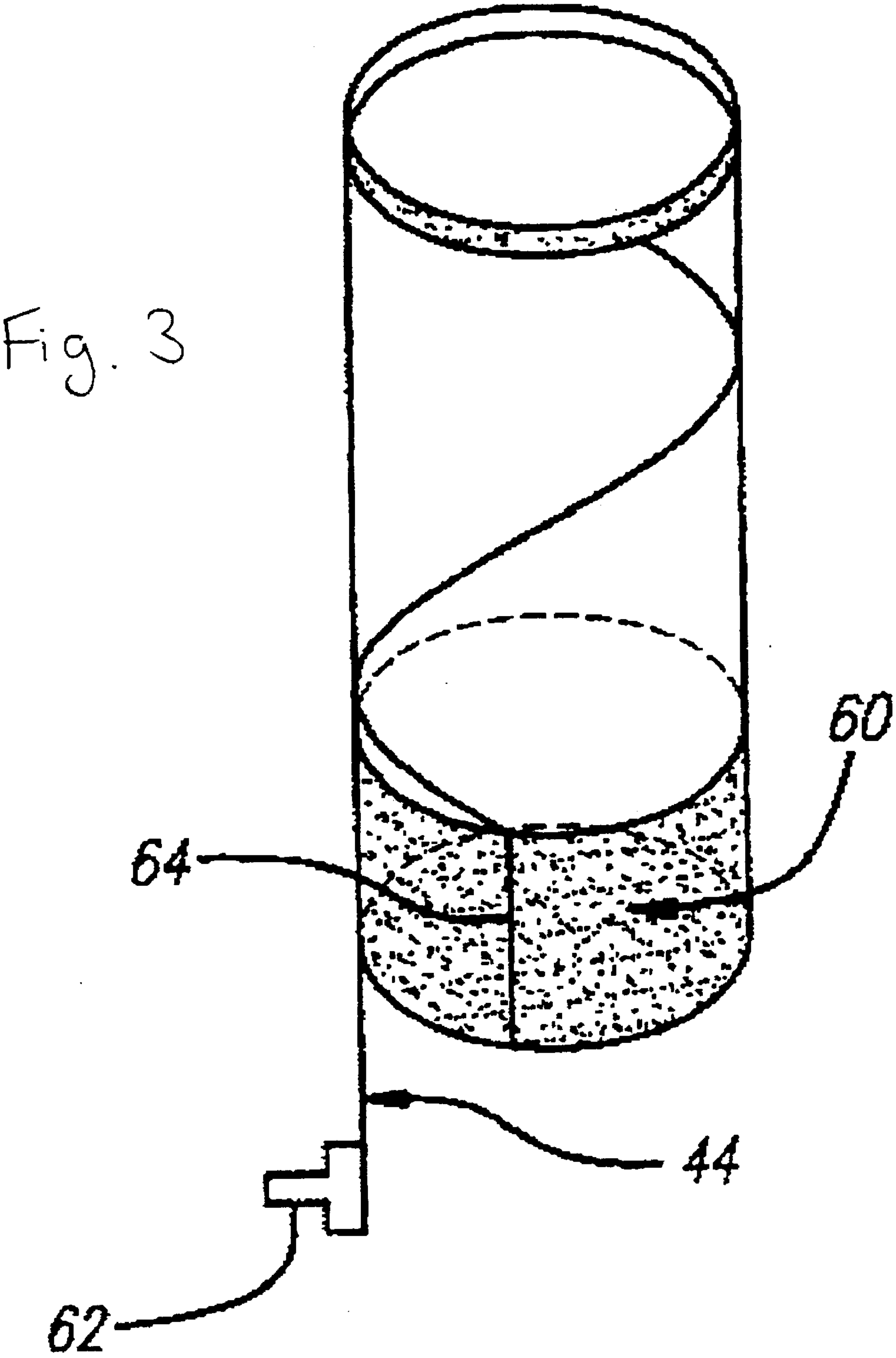
FIG. 3 is an elevational view of a monolithic quadrifilar helix antenna constructed in accordance with the teachings of the present invention.

A 50 ohm line 44 shown in FIG. 3 extends downward from the hybrid junction power divider feed circuit 42 to a connector 62. The junction of the 50 ohm line 44 and hybrid junction power divider feed circuit 42 is accomplished through the same method described above (i.e., no soldering). Although a 50 ohm line is used in this embodiment, it is not absolutely required. Therefore, in an alternative embodiment the connector may be placed adjacent to the hybrid junction power divider feed circuit 42 thereby circumventing the use of the 50 ohm line. Also, impedances other than 50 ohm may be employed if required.

Figure 4:
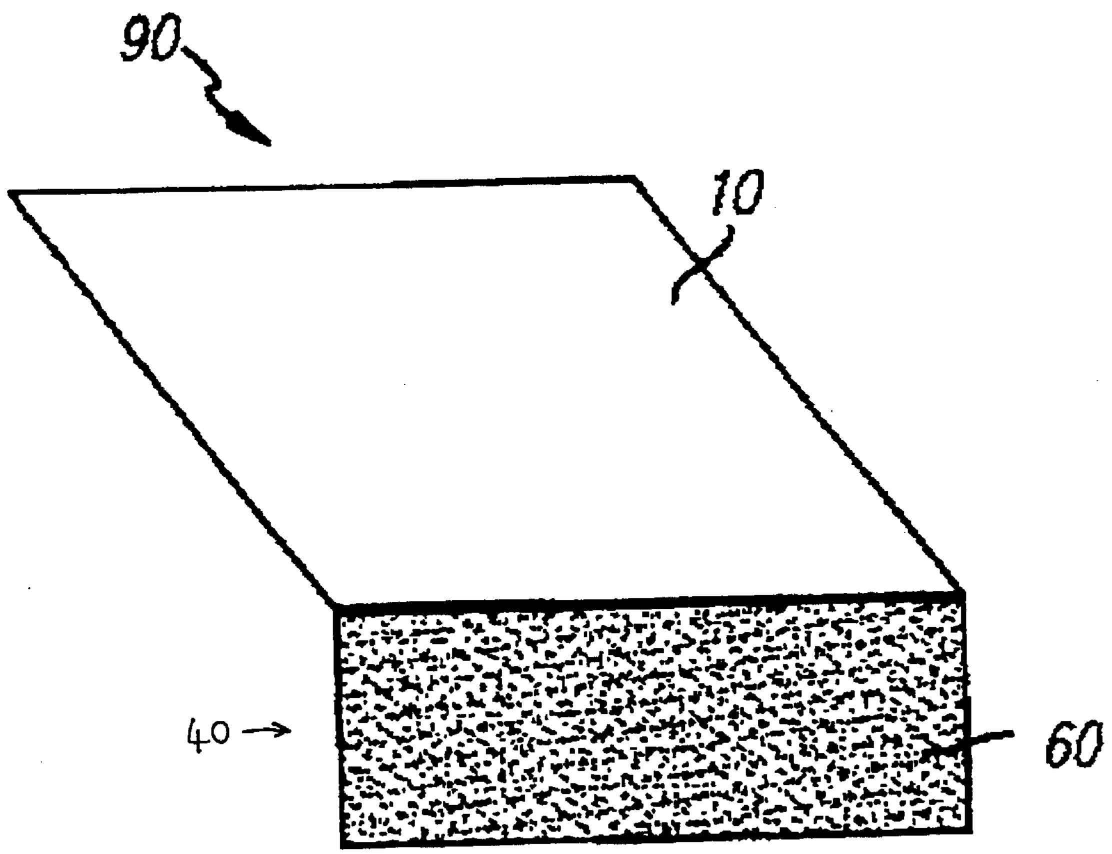
FIG. 4 is a back view of the quadrifilar antenna of FIG. 1.

FIG. 4 shows the back of the quadrifilar antenna of FIG. 1. The lower segment 40 is covered in copper which forms a ground plane 60. The ground plane 60 is not electrically connected to the radiating elements 12, 14, 16 and 18. Hence, the antenna is open circuited. Note that the upper section 10 of FIG. 4 is devoid of copper.

To fabricate the quadrifilar helix antenna of the present invention, the planar antenna of FIG. 1 is bent inwardly into a cylinder as illustrated in FIG. 3. Note that in FIG. 3, the hybrid junction power divider feed circuit 42 and radiating elements 12, 14, 16 and 18 are located within the cylinder whereas ground plane 60 is outside. This is done to protect the antenna 90 from possible damage due to handling and thereby eliminating the need to later run performance tests. Thus, in an alternative embodiment, the planar antenna of FIG. 1 may be bent outward to expose the hybrid junction power divider feed circuit 42 and elements 12, 14, 16 and 18.

To manufacture the antenna of the present invention, the hybrid junction power divider feed circuit 42 has to first be designed to provide impedance matching and 0 to 180° phase shift while fitting into a particular chosen area. Secondly, the 0° and 180° phase shift locations of the hybrid junction power divider feed circuit 42 have to be located. Thirdly, the correct length and impedance of the 90° phased lines 53,56 must be established to allow for both n/4 wavelength mode of operation and phase quadrature between the antenna ports. Once the steps above are accomplished, the correct configuration of all pertinent parts of the antenna is simply etched or deposited onto a dielectric substrate. The dielectric substrate can be made of glass, fiberglass, Teflon or any other material or combination thereof. However, in this case a pliable dielectric substrate is used to facilitate the shaping of the planar antenna of FIG. 1 into a cylinder.

Once the deposition or etching of the copper on the dielectric substrate is completed, the antenna is bent into a cylinder. The antenna is then fastened in that shape by taping the edges of the upper section of the antenna together and by soldering or joining the edges of the ground plane 60 with conductive tape. Finally, a connector is soldered to the end of the input port 50.

Note that with this method, many antennas can be deposited or etched on a large section of dielectric substrate. After the deposition, each antenna can be die cut, rolled into a cylinder, soldered or joined at the right locations and be ready for use. Note also that the soldering is minimal (i.e., one or two soldering connections) and done on non-sensitive parts of the antenna (i.e., ground plane and connector).

Compared with the construction of U.S. Pat. No. 5,541,617, the radiating elements are fed in true phase quadrature. As a result, sensitivity to radome effects is reduced to simple frequency shift, easily dealt with by equal element length alterations. The correct phasing is easier to achieve than in U.S. Pat. No. 5,541,617 and is broader band.

It should be noted that each antenna port 52, 54 is coupled to its respective hybrid port 57,58 by only a single respective phased line 55,56. This can be contrasted with U.S. Pat. No. 6,172,656 in which the 90° phase shift is accomplished using quadrature hybrids. The use of a single phased line instead of a quadrature hybrid provides significant benefits such as reduced ‘real estate’ (i.e. lower area); greater simplicity; and lower power losses. It has been recognized that the phase/amplitude balance over the operating band which can be provided by a quadrature hybrid is not necessary. Furthermore, the 180° hybrid in U.S. Pat. No. 6,172,656 includes a port which is terminated by a resistor. No terminated ports are provided in the 180° hybrid of the preferred feed network.

Figure 5:
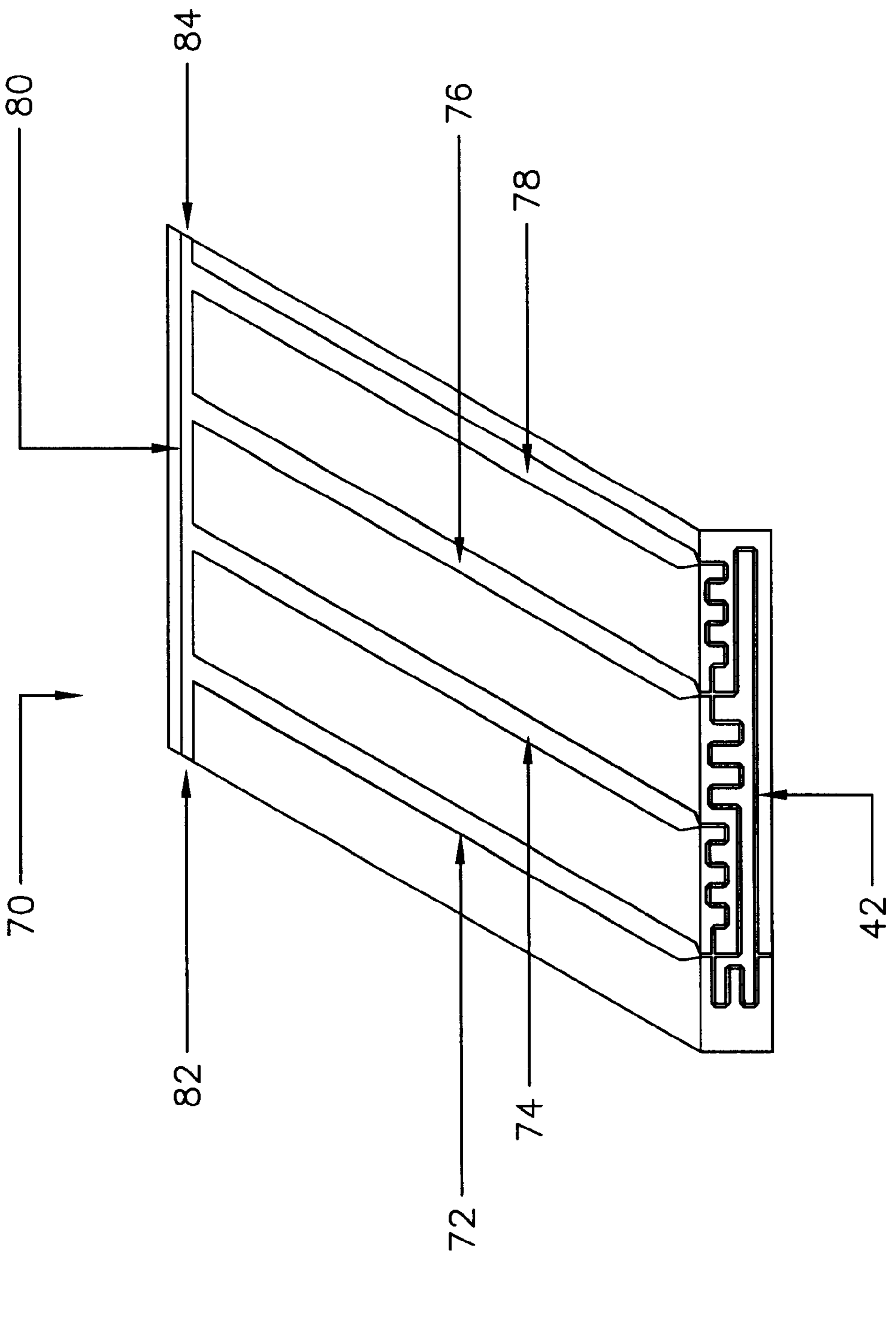
FIG. 5 is a planar view of a closed circuit quadrifilar antenna constructed in accordance with the teachings of the present invention.

An alternative antenna is shown in FIG. 5. In contrast to the antenna of FIG. 1 (which shows open circuited radiating elements) the antenna of FIG. 5 shows a helix antenna 70 with closed circuit radiating elements. The antenna 70 has four radiating elements 72,74,76,78 which are each coupled to the four antenna ports 51–54 of a feed network 42 identical to the network 42 of FIG. 1. Instead of operating in open circuit mode, the elements 72–78 are connected by a shorting ring 80 with ends 82, 84 which are joined together during assembly by conductive tape or solder. The elements are sized to operate in ½ wavelength mode.

The present invention has been described herein with reference to particular embodiments for a particular application. Those having ordinary skill in the art and access to the present teachings will recognize additional modifications, applications and embodiments within the scope thereof.

For example, an amplifier may be inserted between the hybrid junction power divider feed circuit 42 and the 50 ohm line 44. The microstrip feed network 42 may be replaced by a waveguide or stripline coupler. The ring hybrid may be replaced by a coupled line hybrid. For instance in an alternative feed network, the 180° ring hybrid may be replaced by a 90° coupled line hybrid with a 0° degree port and a 90° port, and a 90° Schiffman phase shifter coupled to the 90° port. Thus it can be seen that this circuit configuration will produce a 180° phase difference between the 0° port and the output of the Schiffman phase shifter. Thus the 90° hybrid and Schiffman phase shifter can together be considered to constitute a 180° hybrid coupler. The radiating elements may be aperture fed as in U.S. Pat. No. 6,172,656.

The radiating elements can be phased to operate in either endfire or backfire mode, either in the open-circuit configuration of FIG. 1 or the closed circuit configuration of FIG. 5. Although the feed network is shown with meandering lines to save space, it will be understood that straight lines may be used instead.

The invention is not limited to constructing the antenna into a helix: for instance the radiating elements may form a planar spiral. Nor is the invention limited to four radiating elements. Any number of radiating elements may be used within the scope of the present teachings. Moreover, the radiating elements can be made to operate at n/4 wavelength mode where n is an odd integer, or N/2 wavelength mode where N is an integer.

It is therefore intended by the appended claims to cover any and all such applications, modifications and embodiments within the scope of the present invention.

What is claimed is:

1. An antenna feed network including:

a 180° hybrid coupler having a feed port, a 0° port; and a 180° port having an approximately 180° phase difference with the 0° port;

a first antenna port coupled to the 0° port;

a second antenna port coupled to the 0° port via a respective phased line, the second antenna port having an approximately 90° phase difference with the first antenna port;

a third antenna port coupled to the 180° port; and a fourth antenna port coupled to the 180° port via a respective phased line, the fourth antenna port having an approximately 90° phase difference with the third antenna port.

2. The network of claim 1 wherein the hybrid coupler is a microstrip hybrid coupler.

3. The network of claim 1 wherein the hybrid coupler is deposited on a dielectric substrate.

4. The network of claim 3 wherein a ground plane is deposited on an opposite side of said dielectric substrate.

5. The network of claim 1, wherein the hybrid coupler is a ring hybrid.

6. The network of claim 1, wherein the hybrid coupler has no terminated port.

7. An antenna including:

a 180° hybrid coupler having a feed element, a 0° port; and a 180° port having an approximately 180° phase difference with the 0° element;

a first antenna element coupled to the 0° port;

a second antenna element coupled to the 0° port via a respective phased line, the second antenna element having an approximately 90° phase difference with the first antenna element;

a third antenna element coupled to the 180° port; and a fourth antenna element coupled to the 180° port via a respective phased line, the fourth antenna element having an approximately 90° phase difference with the third antenna element.

8. The antenna of claim 7 wherein the hybrid coupler is a microstrip hybrid coupler.

9. The anterma of claim 7 wherein the hybrid coupler is deposited on a dielectric substrate.

10. The antenna of claim 7 wherein a ground plane is deposited on an opposite side of said dielectric substrate.

11. The antenna of claim 7, wherein the hybrid coupler is a ring hybrid.

12. The antenna of claim 7, wherein the hybrid coupler has no terminated port.

13. The antenna of claim 7, wherein said four radiating elements each have substantially the same length.

14. The antenna of claim 7, wherein said four radiating elements are each coupled to a respective one of said ports at one end, and open circuited at another end.

15. The antenna of claim 7, wherein said four radiating elements are each coupled to a respective one of said antenna ports at one end, and short circuited at the other end.

16. The antenna of claim 7, wherein said four radiating elements are formed into a helix.

17. The antenna of claim 7, wherein said four elements are directly connected to said antenna ports.

* * * * *